United States Patent
Koch et al.

(10) Patent No.: US 12,228,898 B2
(45) Date of Patent: Feb. 18, 2025

(54) METHOD FOR MONITORING A PROCESS ENGINEERING INSTALLATION, AND PROCESS ENGINEERING INSTALLATION

(71) Applicant: Linde GmbH, Pullach (DE)

(72) Inventors: Michael Koch, Munich (DE); Oliver Slaby, Munich (DE)

(73) Assignee: Linde GmbH, Pullach (DE)

( * ) Notice: Subject to any disclaimer, the term of this patent is extended or adjusted under 35 U.S.C. 154(b) by 539 days.

(21) Appl. No.: 17/596,997

(22) PCT Filed: Oct. 5, 2020

(86) PCT No.: PCT/EP2020/025447
§ 371 (c)(1),
(2) Date: Dec. 22, 2021

(87) PCT Pub. No.: WO2021/069098
PCT Pub. Date: Apr. 15, 2021

(65) Prior Publication Data
US 2022/0253026 A1    Aug. 11, 2022

(30) Foreign Application Priority Data
Oct. 10, 2019   (EP) ..................................... 19020564

(51) Int. Cl.
*G05B 17/02*    (2006.01)
*F25J 1/00*    (2006.01)
(Continued)

(52) U.S. Cl.
CPC ............ *G05B 17/02* (2013.01); *F25J 1/0027* (2013.01); *F25J 1/0252* (2013.01);
(Continued)

(58) Field of Classification Search
CPC ....... G05B 13/04; G05B 17/04; F25J 3/04848
(Continued)

(56) References Cited

U.S. PATENT DOCUMENTS

| | | | | |
|---|---|---|---|---|
| 2008/0027677 A1* | 1/2008 | Miller | ................ | G05B 19/4184 |
| | | | | 702/182 |
| 2009/0177439 A1* | 7/2009 | Samples | ............ | G05B 23/0272 |
| | | | | 702/182 |

(Continued)

FOREIGN PATENT DOCUMENTS

| | | |
|---|---|---|
| DE | 102016115331 A1 | 2/2018 |
| EP | 1921406 A1 | 5/2008 |

*Primary Examiner* — Jigneshkumar C Patel
(74) *Attorney, Agent, or Firm* — MILLEN, WHITE, ZELANO & BRANIGAN, P.C.; Brion P. Heaney

(57) ABSTRACT

The invention relates to: a method for monitoring a process engineering installation, in which a model of the process engineering installation is used to ascertain values of at least one performance parameter of the process engineering installation from actual values of at least one operating parameter of the process engineering installation that occur during operation of the process engineering installation, wherein the model is used to ascertain comparison values of the at least one performance parameter of the process engineering installation from setpoint values of the at least one operating parameter, and wherein mutually corresponding values and comparison values of the at least one performance parameter are taken as a basis for ascertaining at least one performance gap in the operation of the process engineering installation and to a process engineering installation.

15 Claims, 2 Drawing Sheets

(51) Int. Cl.
    *F25J 1/02*          (2006.01)
    *F25J 3/04*          (2006.01)
    *G05B 13/04*        (2006.01)
    *G05B 23/02*        (2006.01)

(52) U.S. Cl.
    CPC ...... *F25J 3/04848* (2013.01); *G05B 23/0224* (2013.01); *G05B 13/04* (2013.01)

(58) Field of Classification Search
    USPC .......................................................... 700/30
    See application file for complete search history.

(56) References Cited

U.S. PATENT DOCUMENTS

| | | | |
|---|---|---|---|
| 2010/0082120 A1* | 4/2010 | Stephenson | G05B 13/048 700/95 |
| 2018/0032940 A1 | 2/2018 | Trenchard et al. | |

* cited by examiner

METHOD FOR MONITORING A PROCESS ENGINEERING INSTALLATION, AND PROCESS ENGINEERING INSTALLATION

The invention relates to a method for monitoring a process engineering installation, such as an air separation installation, and to a computing system for implementing the method, and to a process engineering installation.

PRIOR ART

Process engineering installations are typically understood to mean installations for implementing substance changes and/or substance conversions with the aid of purpose-oriented sequences of physical and/or chemical and/or biological and/or nuclear actions. Such changes and conversions typically include crushing, sieving, mixing, heat transfer, rectification, crystallization, drying, cooling, filling and superimposed substance conversions, such as chemical, biological or nuclear reactions.

A typical representative of separating a feed fluid stream into individual fluid components is air separation. The production of air products in liquid or gaseous state via low-temperature separation of air in (cryogenic) air separation units (ASU) is known and, for example, is described in H.-W. Häring (Editor), Industrial Gases Processing, Wiley-VCH, 2006, in particular section 2.2.5, "Cryogenic Rectification".

Air separation units have distillation column systems that, for example, can be designed as two-column systems, in particular as classical Linde double-column systems, but also as three-column or multi-column systems. In addition to the distillation columns for extracting nitrogen and/or oxygen in liquid and/or gaseous state (for example, liquid oxygen, LOX; gaseous oxygen, GOX; liquid nitrogen, LIN; and/or gaseous nitrogen, GAN), i.e., distillation columns for nitrogen-oxygen separation, distillation columns for extracting additional air components can be provided, in particular the noble gases krypton, xenon and/or argon. Distillation columns are also referred to as distillation towers.

As a rule, such process engineering installations are monitored during their operation, wherein in particular an ultimately accrued power consumption or an accrued energy consumption can also be determined. How much energy might possibly have been saved can thus possibly be determined after the fact.

Against this background, the present invention is based on the object of improving the operation of a process engineering installation, in particular with regard to its efficiency.

DISCLOSURE OF THE INVENTION

This object is achieved by a method for monitoring a process engineering installation, and a computing system for implementing the method, and a process engineering installation having the features of the independent claims. Embodiments are the subject matter of the dependent claims and of the description below.

Advantages of the Invention

The present invention relates to a method for monitoring a process engineering installation, for example as explained in more detail above, for example, and in fact using a model of the process engineering installation.

Such a model of the process engineering installation (digitally) maps the installation, in particular an operating state of the installation, and is executed on a suitable computing system such as a computer, for example. The model can thereby be supplied with input values and there are corresponding output values, and in fact as would (ideally) also be the case during the operation of the installation itself. This also means that different operating parameters of the installation, such as a flow of a medium (for example air or a component thereof, such as oxygen or nitrogen, in the event of an air separation installation) in the process engineering installation, a temperature of a component of the process engineering installation, and/or a temperature and/or a composition and/or a pressure of a medium in the process engineering installation, are accordingly depicted in the model. This can be done via suitable equations, for example.

Output values that the model then outputs from the input values corresponding to the operating parameters are in particular those parameters that are indicative of a performance or efficiency of the process engineering installation ("key performance indicators"). Such parameters are presently to be referred to with the term "performance parameters". For example, this can be a power consumption or a degree of efficiency of a component of the process engineering installation, a power consumption or a degree of efficiency of the (entire) process engineering installation and/or a recovery measure of a medium (for example argon in the event of an air separation installation) in the process engineering installation.

Given such a model, idealized assumptions or values—i.e., setpoint values—with which the installation runs optimally (insofar as is possible) in accordance with specifications or also based on empirical values, i.e. also has corresponding optimal values (insofar as is possible) for the performance parameter(s), can now be determined for one or more performance parameters of the installation. Ambient conditions, such as air temperature and cooling water flow temperature, are hereby also taken into account when the model is created, for example.

In the proposed method, using the model of the process engineering installation, values of at least one performance parameter of the process engineering installation are now determined from actual values of at least one operating parameter of the process engineering installation occurring during the operation of the process engineering installation. Such actual values can, for example, be measured or also estimated, for example by means of an observer.

Moreover, using the model, comparative values of the at least one performance parameter of the process engineering installation are determined from setpoint values—thus the aforementioned, idealized values or specifications—of the at least one operating parameter. In other words, using the model, the values for the performance parameters are thus determined on the one hand respectively from the idealized specifications and on the other hand respectively for the (currently) actually present or used values of the operating parameters.

Based on mutually corresponding values and comparative values of the at least one performance parameter—i.e., in particular pairs of a respective value and a corresponding comparative value corresponding to the same operating state or the same point in time—at least one performance gap of the operation of the process engineering installation is then determined. For this purpose, in the simplest instance a difference between value and comparative value can be calculated.

Similar to the term "performance parameter", the term "performance gap" is hereby to be understood to mean a gap or difference between the actually present value and the theoretically or ideally achievable value of, for example, a power consumption. The same applies, for example, to an actual yield of a recovered medium and to a theoretical or ideally achievable yield. The performance gap determined in this way thus indicates a certain savings or improvement potential for the operation of the process engineering installation.

It is also hereby particularly expedient if the determined performance gap or the determined plurality of performance gaps—in the event of a plurality of performance parameters—are made accessible or made available to respective locations or persons in a suitable manner, or are generally made available via a communication means. For example, this can take place—the method is expediently executed at a computing system—via an (automatically sent) e-mail or the like. A display or presentation can likewise take place at suitable display means, for example in a control room of the process engineering installation.

The values and the (associated) comparative values of the at least one performance parameter are thereby expediently determined at regular time intervals, for example every hour, and/or given predetermined operating states, possibly even after a change in an operating state, of the process engineering installation. With this, it can be achieved that information about any performance gaps or optimization potential is provided in as timely a manner as possible.

A statistical relevance of the at least one performance gap is preferably determined using a plurality of mutually corresponding values and comparative values (i.e., the aforementioned pairs) of the at least one performance parameter. This applies in particular in the event of a plurality of performance parameters. This can also be referred to as a hypothesis test. The current, mutually corresponding values and comparative values, for example from the last ten hours, are hereby considered and assessed with regard to their statistical relevance, for example as a random sample from the mutually corresponding values and comparative values that were determined earlier in time, for example over a time period of one month. It is also conceivable that not only the earlier determined values and comparative values of the appertaining installation are used, but rather also those of other, comparable installations.

For example, a frequently occurring performance gap can hereby be classified as particularly relevant and then as a priority to remedy. This can likewise apply to particularly high or large performance gaps. It is also conceivable that a threshold value (e.g., a mean value) is defined for a specific performance parameter or is also determined from past values or comparative values, and a current performance gap is only classified as relevant if this threshold value is exceeded.

It is also particularly preferred if an improvement measure is determined for the at least one performance gap, and this measure is then in particular also—like the performance gap itself—made accessible or made available to respective locations or persons in a suitable manner. Such an improvement measure can consist of the change in an operating parameter, for example. A suitable measure can thereby be determined, for example, based on experimental or test values, but it is also conceivable that such a measure be determined based on the actual values and setpoint values of an operating parameter. For example, it can be recommended to modify a value of the operating parameter to the setpoint value, or to at least adapt it in its direction. However, measures that are also not directly dependent or are even independent of the operating parameter are also conceivable. Alternatively, a maintenance activity can be proposed, such as a cleaning process at the installation (in the sense of an improvement measure). It is also conceivable that the improvement measure generally relates to the correction of a malfunction of the process engineering installation.

An analysis with regard to a plurality of operating states of the installation is expediently performed in the assessment of the relevance of a performance gap and/or of a corresponding improvement measure.

Static significance indicators may thereby be used, which allows a simple implementation, but then ultimately always leads to the same assessment for the same performance gaps or improvement measures. However, it can also be expedient to use dynamic, i.e. variable, significance indicators so that, depending on the situation, a more detailed assessment of the relevance of the performance gaps or improvement measures can take place.

In this way, it can be achieved that priority optimizations with high improvement potential are performed, whereas less relevant optimizations are deferred, for example.

The proposed method can in principle be used for a wide variety of types of process engineering installations, but is particularly expedient and advantageous for gas-treating process engineering installations, such as an air separation installation or a carbon dioxide installation, in particular a carbon dioxide liquefaction installation, since here the optimization potential is particularly high. Given a carbon dioxide liquefaction installation, a material stream containing predominantly or significantly carbon dioxide is refined in that impurities are removed and the carbon dioxide thus purified is liquefied.

A particular advantage of the proposed method and the use of the model of the process engineering installation is that the accuracy with which the model maps the process engineering installation is rather of subordinate importance, since both the values and the comparative values of the at least one performance parameter are determined by means of the same model. Any shortcomings in the model therefore have an equal effect—at least in good approximation—on the values and the comparative values, which, however, has no or barely any influence in the difference calculation.

The subject matter of the invention is furthermore a computing system (or a computing unit) for monitoring a process engineering installation, which is configured, in particular programmatically, to implement a method according to the invention. Such a computing system can, for example, be provided separately from an installation, but can also be integrated into an open-loop and/or closed-loop control system for such an installation.

The subject matter of the invention is furthermore a process engineering installation, in particular a gas-treating process engineering installation, having a computing system according to the invention.

The invention is explained in more detail below with reference to the accompanying drawings, which show various installation parts using which the measures according to the invention are explained.

DETAILED DESCRIPTION OF THE DRAWING

Figure 1:
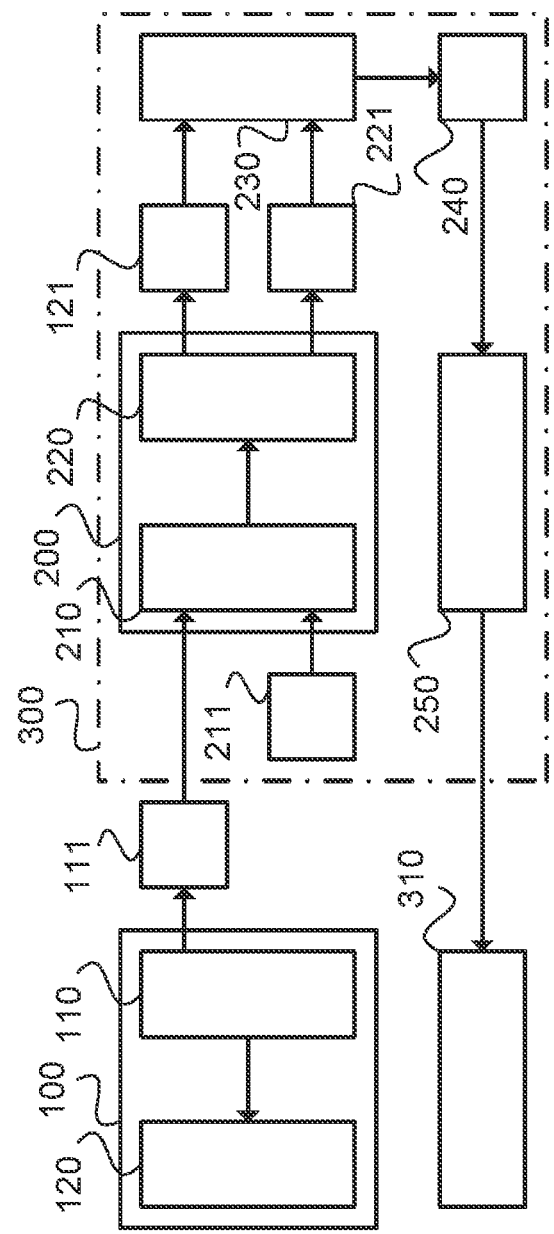
FIG. 1 schematically shows a workflow of a method according to the invention, in a preferred embodiment.

FIG. 1 schematically shows a workflow of a method according to the invention, in a preferred embodiment. For this purpose, a process engineering installation 100, for example an air separation installation, is shown roughly schematically.

By way of example, an operating parameter 110 and a performance parameter 120 are indicated for this purpose, wherein the latter is influenced by the former. As already mentioned, the operating parameter can, for example, be a flow of a medium or a temperature; the performance parameter can, for example, be a power consumption of the process engineering installation or a recovery rate of a medium. It is understood that a plurality of different operating parameters and a plurality of different performance parameters are present in a typical process engineering installation.

Furthermore, a computing system 300 is shown, for example a computer, at which the proposed method for monitoring the process engineering installation 100 can be implemented. For this purpose, for example within the scope of a suitable program, a model 200 of the process engineering installation 100 is used, with which the process engineering installation is mapped as realistically as possible. By way of example, an operating parameter 210 and a performance parameter 220 that correspond to the operating parameter 110 or the performance parameter 120 are also provided for this purpose.

It is understood that those operating parameters or performance parameters with regard to which the monitoring is to take place are mapped in the model 200. The real correlation between operating parameter and performance parameter can be represented in the model 200, for example by suitable equations.

The model 200 is thereby be supplied with input values and there are corresponding output values, and in fact as would (ideally) also be the case during the operation of the installation 100 itself. For the operating parameters 110 or 210 (this then applies accordingly in the event of a plurality of operating parameters), idealized assumptions or values—i.e., setpoint values—are hereby determined, with which the installation runs optimally (insofar as is possible) in accordance with specifications or also based on empirical values; i.e., it also has corresponding optimal values (insofar as is possible) for the performance parameter(s). Such a setpoint value is shown by way of example with 211.

Given the proposed method, the actual or measured or estimated values 111 of the operating parameter 110 or 210 are now used in order to determine a corresponding value 121 of the associated performance parameter 120 or 220 with the model 200. At the same time or in parallel, the corresponding value, here referred to as comparative value 221, is also determined or calculated by means of the model 221 from the idealized value or setpoint value 211. Using the model 200, the values for the performance parameters are thus determined once from the idealized specifications and once from the (current) actually present values of the operating parameters.

A performance gap 230 of the operation of the process engineering installation 100 is then determined based on the mutually corresponding values 121 and comparative values 221 of the performance parameter 120 or 220, thus in particular pairs of respectively a value and a corresponding comparative value corresponding to the same operating state or the same point in time. For this purpose, in the simplest instance, a difference is calculated between value 121 and comparative value 221.

The term "performance gap" is hereby to be understood—as has already been noted—to mean, for example, a gap or difference between the actually present and the theoretically or ideally achievable power consumption. The performance gap 230 determined in this way thus indicates a certain savings or improvement potential for the operation of the process engineering installation 100.

Based on data accruing over time relating to performance, a statistical relevance of the performance gap 230 can now be determined for a current value of a performance gap, for example within the scope of a statistical analysis 240. Furthermore, an improvement measure 250 can additionally or alternatively be determined, which indicates how the potential present on the basis of the detected performance gap can be better utilized for more efficient operation of the process engineering installation 100. Both the performance gap and the improvement measure can then be provided via a communication means 310. The communication means can, for example, be a (digital) display means, or an e-mail that is then correspondingly sent to relevant persons.

Figure 2:
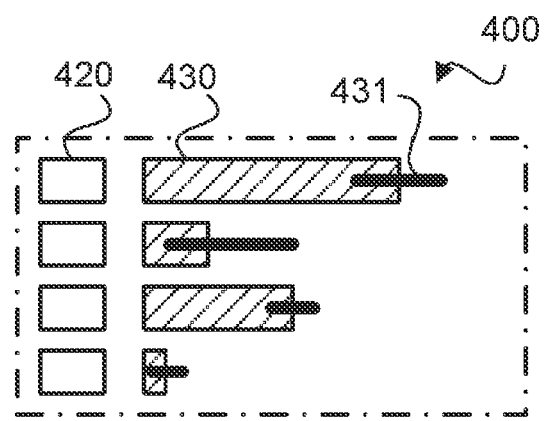
FIG. 2 schematically shows a representation of performance gaps in a method according to the invention, in a preferred embodiment.

FIG. 2 schematically shows a representation of performance gaps in a method according to the invention, in a preferred embodiment. For this purpose, a display means 400 is shown by way of example as a communication means with a corresponding content.

There, four different performance parameters are listed by way of example on the left in a column, one above another, one of which is designated with 420. Next to this to the right, the performance gaps 430 associated with the performance parameters or the corresponding values or amounts are shown in the form of a bar with uncertainty. By way of example, one of the performance gaps is designated with 430, the associated uncertainty with 431. Such a representation of performance gaps can provide corresponding persons with a quick overview of where savings possibilities or efficiency increases are possible.

Figure 3:
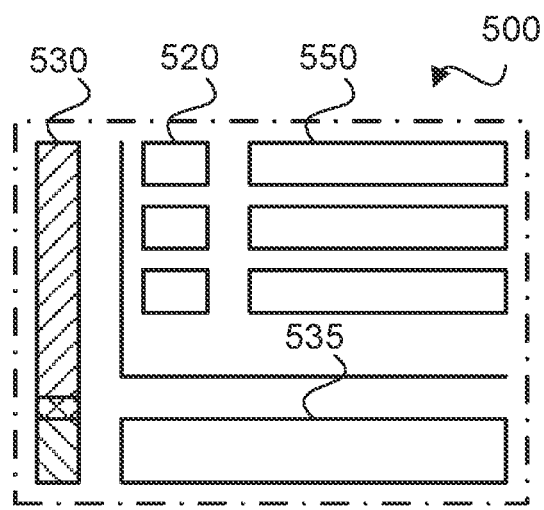
FIG. 3 schematically shows a representation of performance gaps in a method according to the invention, in a further preferred embodiment.

FIG. 3 schematically shows a representation of performance gaps in a method according to the invention, in a further preferred embodiment. For this purpose, an e-mail 500 is shown by way of example as a communication means with a corresponding content.

Different performance gaps with corresponding values are shown there by way of example on the left, one atop another, using which a total savings potential can be detected. By way of example, one of the performance gaps is designated with 530; 535 indicates a legend using which, for example, the individual bars can be associated to the left of the performance parameters.

Three different performance parameters are listed in the area at the top right, one of which is designated with 520. Shown to the right of this are the improvement measures associated with the performance parameters, if applicable determined analytically, one of which is designated with 550. Such a representation of performance gaps and improvement measures can provide corresponding persons with a quick overview of how savings possibilities or efficiency increases are possible or can be achieved simply and quickly. It is also conceivable that the content of the e-mail shown by way of example is designed to be interactive.

Overall, a particularly simple, fast, and efficient improvement of an operation of a process engineering installation can be achieved with the proposed method explained using examples, in that, in particular, automated savings possibilities are demonstrated and improvement measures are proposed.

The invention claimed is:

1. A method for monitoring a process engineering installation, the method comprising:
    measuring actual value(s) of at least one operating parameter of the process engineering installation occurring during operation of the process engineering installation,
    determining values of the at least one performance parameter of the process engineering installation, using a model of the process engineering installation, from the actual value(s) of the at least one operating parameter of the process engineering installation measured during operation of the process engineering installation,
    determining comparative values of the at least one performance parameter of the process engineering installation, using the model, from setpoint values of the at least one operating parameter, and
    determining at least one performance gap of the operation of the process engineering installation based on mutually corresponding values and comparative values of the at least one performance parameter,
    wherein the at least one operating parameter is selected from flow of a medium in the process engineering installation, a temperature of a component of the process engineering installation, a temperature of a medium in the process engineering installation, a composition of a medium in the process engineering installation, and/or a pressure of a medium in the process engineering installation;
    determining an improvement measure for the at least one performance gap; and
    providing the improvement measure via a communication means.

2. The method according to claim 1, wherein the values and the comparative values of the at least one performance parameter are determined at regular time intervals.

3. The method according to claim 2, wherein the values and the comparative values of the at least one performance parameter are determined at predetermined operating states of the process engineering installation.

4. The method according to claim 1, further comprising determining a statistical relevance of the at least one performance gap using a plurality of mutually corresponding values and comparative values of the at least one performance parameter.

5. The method according to claim 1, further comprising determining an improvement measure is for the at least one performance gap.

6. The method according to claim 5, wherein the improvement measure is determined on the basis of static significance indicators.

7. The method according to claim 5, wherein the improvement measure is determined based on dynamic significance indicators.

8. The method according to claim 1, wherein the at least one performance parameter is selected from a power consumption of a component of the process engineering installation; a power consumption of the process engineering installation; a recovery rate of a medium in the process engineering installation; a degree of efficiency of a component of the process engineering installation; and a degree of efficiency of the process engineering installation.

9. The method according to claim 1, wherein the at least one performance gap is provided via a communication means.

10. The method according to claim 9, wherein the process engineering installation is an air separation installation.

11. The method according to claim 9, wherein the process engineering installation is a carbon dioxide liquefaction installation.

12. A computing system for monitoring a process engineering installation, which is configured to implement a method according to claim 1.

13. A process engineering installation having a computing system according to claim 12.

14. A gas-treating process engineering installation having a computing system according to claim 12.

15. The method according to claim 1, wherein the values and the comparative values of the at least one performance parameter are determined at predetermined operating states of the process engineering installation.

* * * * *